UNITED STATES PATENT OFFICE.

P. W. THOMAS, OF LEVEE, KENTUCKY.

IMPROVEMENT IN COMPOSITIONS FOR TANNING.

Specification forming part of Letters Patent No. 33,314, dated September 17, 1861.

*To all whom it may concern:*

Be it known that I, P. W. THOMAS, of Levee, in the county of Montgomery and State of Kentucky, have invented a new and useful Improvement in Tanning; and I do hereby declare that the following is a full, clear, and exact description of the same.

The object of my invention is to thoroughly tan all kinds of leather in much shorter time than is required by the ordinary bark process; and it consists in the use of certain chemicals, which I will proceed to describe in such a manner that others skilled in the art will be enabled to practice my invention.

The materials and proportions constituting my invention are as follows: fifty pounds of gum-catechu, three and one-fourth pounds of muriate of soda, one-half pound of India kino, one-fourth pound of carbonate of soda, one pound of starch, one-half pound of biborate of soda. These various materials are dissolved in water and combined together to form a compound solution.

I use catechu on account of its large proportion of tannic acid or tannin, amounting to more than fifty per cent. I use muriate of soda on account of its peculiar and superior curative quality. I use India kino for its powerful astringent quality, together with its tannic acid. I use carbonate of soda because of its peculiar softening property and the effect which it has on the catechu and kino to bring out the tannic acid they contain more readily, and which therefore causes the leather to be produced in less time. I use biborate of soda for its boracic acid, which, when united with the tannic acid of the catechu and kino, forms a more perfect tannic acid or tannin, together with the other components, than can be produced by any other compound, and its effect on the gelatinous portion of the hide is to produce leather sooner and of a superior quality than by the old bark process.

I handle the hides at first in a liquor compound of about one-sixth of the amount that is required to tan them until the grain is well stained, and then I increase the strength every day until the tanning operation is completed and the leather produced. Calf-skins will be tanned in from three to eight days, according to their thickness. Hides that weigh from sixty to seventy pounds will be tanned in thirty to forty days.

I am of the opinion that the tannin produced by the chemicals compounded as described will produce leather of more than ordinary tenacity; and it will be observed that all the materials used are cheap and abundant.

I do not claim the simple use of catechu and muriate of soda, as I am aware that they have been used before; and, so far as these materials are concerned, my invention consists in using them in combination with the other chemicals in the proportions specified.

I claim—

The tanning solution compounded of the materials described, substantially in the proportions specified.

P. W. THOMAS.

Witnesses:
W. A. LIGHTHALL,
H. C. AKIN.